United States Patent
Kim

(10) Patent No.: US 7,012,950 B1
(45) Date of Patent: Mar. 14, 2006

(54) APPARATUS FOR GENERATING PSEUDO-NOISES CODE AND METHOD FOR GENERATING PSEUDO-NOISE CODES USING THE SAME

(75) Inventor: Jong Heon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 789 days.

(21) Appl. No.: 09/712,145

(22) Filed: Nov. 15, 2000

(30) Foreign Application Priority Data

Nov. 15, 1999 (KR) ................................ 1999/50670
Mar. 13, 2000 (KR) ................................ 2000/12549

(51) Int. Cl.
*G06F 7/58* (2006.01)
*H04B 1/707* (2006.01)

(52) U.S. Cl. .................... 375/140; 375/141; 375/146; 375/147; 708/252; 708/253

(58) Field of Classification Search ................ 375/140, 375/141, 146, 147, 150, 152, 343; 327/164; 331/78; 708/250, 252, 253
See application file for complete search history.

(56) References Cited

U.S. PATENT DOCUMENTS

| 5,228,054 | A | | 7/1993 | Rueth et al. ................... 375/1 |
| 5,412,665 | A | * | 5/1995 | Gruodis et al. ............. 714/739 |
| 6,061,417 | A | * | 5/2000 | Kelem ......................... 377/26 |
| 6,636,553 | B1 | * | 10/2003 | Sriram ....................... 375/130 |

* cited by examiner

*Primary Examiner*—Khai Tran
*Assistant Examiner*—David B. Lugo
(74) *Attorney, Agent, or Firm*—Fleshner & Kim, LLP

(57) ABSTRACT

An apparatus for generating pseudo-noise codes adapted for advancing or retarding pseudo-noise chips generated therefrom within one clock in a radio communication network based on code division multiple access (CDMA). The apparatus includes a control uni for outputting a control signal for the normal state or a PN chip advance; a plurality of MUXs for outputting an output value of the next state for a normal operation or an output value of a PN chip advance as an output signal in response to the control signal of the control unit; and a plurality of shift registers for outputting PN chip codes of the next or the second next state during one system clock time period in response to said MUXs. Further, the input end of each of the shift registers is connected to the output end of each MUX.

6 Claims, 8 Drawing Sheets

APPARATUS FOR GENERATING PSEUDO-NOISES CODE AND METHOD FOR GENERATING PSEUDO-NOISE CODES USING THE SAME

BACKGROUND OF THE INVENTION

1. Field of the Invention

The invention relates to an apparatus for generating pseudo-noise codes, and in particular to an apparatus for generating pseudo-noise codes adapted for advancing or retarding 1 pseudo-noise chip generated therefrom within one clock cycle in a radio communication network based on code division multiple access (CDMA), and a method for generating pseudo-noise codes by using the pseudo-noise code generating apparatus.

2. Description of the Related Art

In a radio communication network based on the code division multiple access (hereinafter will be referred to as CDMA), a pseudo-noise or pseudorandom noise generator is generally applied to a receiving or transmitting end of a communication apparatus. A pseudo noise code generator applied to the receiving end performs user discrimination, time and phase locking and decoding on signals received from the receiving end by generating pseudo-noise (hereinafter will be referred to PN) sequence.

In IS-95 as the international standard of the CDMA communication system, a Long PN code generator for ($2^{42}$-1) beat length and a short PN code generator for $2^{15}$ are currently recommended. Herein, the short PN code generator generates short PN code lines of $2^{15}$ beat length in respect to each of an in-phase (hereinafter will referred to I) channel and a quadrature-phase (hereinafter will be referred to Q) channel.

Again, a typical PN code generator has length of ($2^n$-1). Therefore, the foregoing PN code generator of the IS-95 standard can be referred as a typical PN code generator. However, the short PN code generator is modified from the typical PN code generator by inserting "0" beat output to generate $2^n$ beat length.

The PIN codes generated from these pseudo noise code generators are generated by a Linear sequence shift register (hereinafter will be referred to LSSR) composed of n number of flip-flops of shift registers. In particular, the pseudo noise code generators are applied so that a searcher of a base station receiver or terminal receiver can rapidly acquire pilot signals included in the received signals and a finger of the receiver can track the PN codes included in the received signals. Here, the PN codes are generated by the pseudo noise code generator to find PN codes included in the received signals in the receiver of the base station or terminal, and offsets of the PN codes are intentionally retarded or advanced to perform operations for acquiring pilot signals or finding the PN codes.

FIG. 1 is a block diagram for showing the configuration of a PN code generator of the prior art, wherein 4 stage LSSR 1 to 4 is used.

Before explaining the apparatus shown in FIG. 1, it should be understood that N times clock of the PN chip rate is used for a system clock. Namely, the system clock is "chip rate × N." The number of clocks applied to the LSSR 1 to 4 of FIG. 1 is adjusted through a clock enable according to the system clock, and accordingly the PN code generator shown in FIG. 1 is normally operated and one PN chip advance or one PN chip retard is performed.

In FIG. 1, when the PN code generator composed of an exclusive OR(EOR) gate 5 and 4 stage LSSRs 1 to 4 is normally operated, the clock enable is enabled with one system clock for N number of system clocks. In this way, one system clock is applied to the LSSRs 1 to 4 during one PN chip time period.

However, the PN code lines, after generated according to the normal operation of the PN code generator, are intentionally retarded or advanced for one PN chip so as to be used for code acquisition or code tracking.

One next PN chip retard means that the state of the LSSR 1 to 4 is repeated for one PN chip time period, in which zero system clock is applied to the LSSR 1 to 4 during one PN chip time period or N number of system clocks by adjusting the clock enable.

One next PN chip advance means that the state of the LSSR 1 to 4 bypasses the next state to transit into the second state, wherein 2 system clocks are applied to LSSR 1 to 4 during one chip time period or N number of system clocks. Therefore, the conventional PN code generating methods have a problem that a system clock at least two times of the PN chip speed is required for one PN chip advance.

In other words, in the communication atmosphere from now on, requirements about functions of a modem of each communication equipment including the base station or terminal are getting more various. Therefore, structure of a modem(MSM) is being more complex and number of subscribers on the radio communication network is gradually increasing also. Accordingly, a pseudo noise code generator is required which can carry out one PN chip retard or advance within the minimum system clocks available in this communication atmosphere.

SUMMARY OF THE INVENTION

It is therefore an object of the invention, which is proposed considering the foregoing problems of the prior art, to provide an apparatus for generating pseudo noise codes and method for generating pseudo noise codes using the same in which one PN chip generated therefrom can be advanced during one clock while using a clock same as chip rate in a radio communication system.

It is another object of the invention to provide an apparatus for generating pseudo noise codes which can generate PN codes having $2^n$ bit length by inserting "0" bit output while using a clock same as chip rate.

To obtain these objects of the invention, it is characterized in an apparatus for generating pseudo noise codes comprising an LSSR including n number of MUXs and shift registers connected in series with each other, said apparatus performs the steps of inputting signals for obtaining the next state of the LSSR in the normal state, obtaining the next state of the LSSR for a PN chip advance, and obtaining the next state of the LSSR for a PN chip retard; generating control signals for changing the next state in respect to the LSSR; multiplying the input signals to each of the MUX in response to the control signals; and performing an operation corresponding to the multiplied signals during one clock.

To obtain these objects of the invention, it is further characterized in first circuit for obtaining the next normal state of n bit length shift registers; second circuit for obtaining the next state of the shift registers for one PN chip advance; third circuit for obtaining the next state of the shift registers for one chip retard; and a plurality of MUXs arranged in an input end of each of the shift registers.

BRIEF DESCRIPTION OF THE DRAWINGS

Hereinafter, preferred embodiments of the invention will be described in detail in reference to the accompanying drawings, wherein.

DETAILED DESCRIPTION OF THE PREFERRED EMBODIMENT

Figure 1:
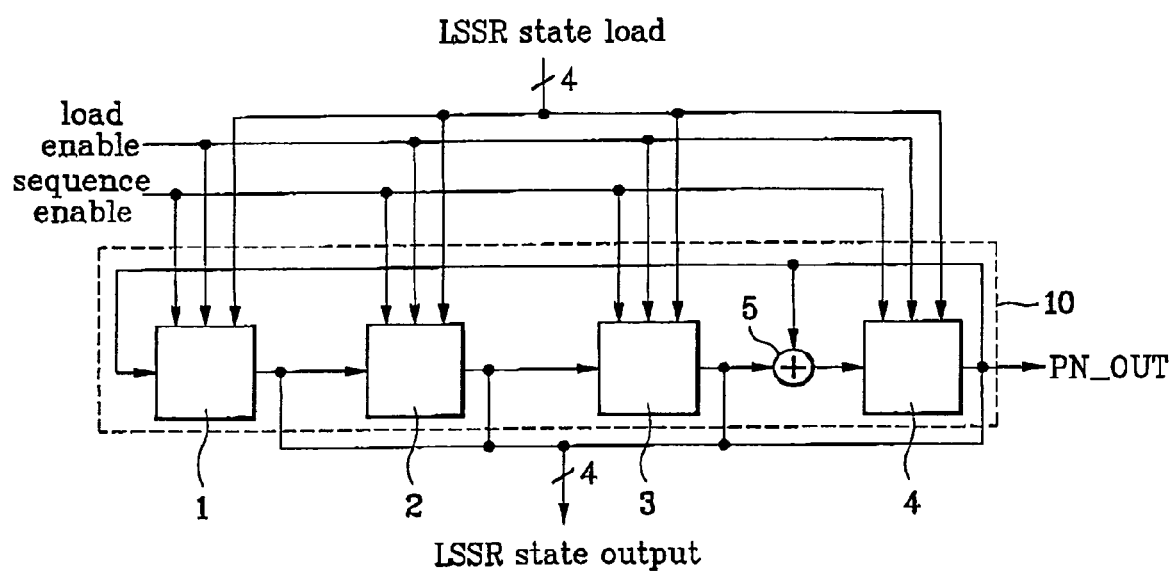
FIG. 1 is a block diagram for showing the configuration of a PN code generator of the prior art given with fourth order generation polynomial.

In general, a PN code generator is comprised of exclusive OR gates (hereinafter will referred to XOR gates) according to generation polynomial, and an LSSR having several shift registers as shown in FIG. 2 to FIG. 5.

For description of the invention, nth order generation polynomial g(X) as ia equation 1:

$$g(X)=g_n X^n + g_{n-1} X^{n-1} + \ldots + g_1 X + 1 \qquad \text{equation 1}$$

is assumed to be expressed in vectors as in equation 2:

$$\bar{g}=[g_n g_{n-1} \ldots g_1 g_0]$$

$$g_i = \begin{cases} 1, & 1 = n \\ 0 \text{ or } 1, & 0 < i < n, \text{ where in } i \text{ is an integer} \\ 1, & i = 0 \end{cases} \qquad \text{equation 2}$$

If the present state of the LSSR is assumed $\bar{r}_m$, the present state like this can be expressed in a vector form as can be seen in equation 3:

$$r_m = [r_{n,m} r_{n-1,m} \ldots r_{1,m} r_{0,m}]$$

$$r_{i,m} = \begin{cases} 0 \text{ or } 1, & 0 < i \le n, \text{ wherein } i \text{ is an integer} \\ 0, & i = 0 \end{cases} \qquad \text{equation 3}$$

Herein, if the PN code generator is normally operated, the next state $\bar{r}_{m+1}$ of the LSSR can be obtained as in equation 4:

$$r_{m+1} = [r_{n,m+1} r_{n-1,m+1} \ldots r_{1,m+1} 0]$$

$$r_{i,m+1} = \begin{cases} r_{i-1,m} \oplus (r_{n,m} g_{i-1}), & 0 < i \le n, \\ & \text{wherein } i \text{ is an integer} \\ 0, & i = 0 \end{cases} \qquad \text{equation 4}$$

according to the present state $\vec{r}_m$ of the LSSR, the most significant bit(hereinafter will be referred to MSB) $r_{n,m}$, and generation polynomial $\vec{g}$ as can be seen in equation 2.

In equation 4 like this, the following resultant values are input to the input end of a random ith shift register, wherein i is an integer from 2 to n, except the least significant bit(hereinafter will be referred to LSB) shift register of n number of shift registers.

First, an input value is obtained as a result of OR operating the output signal of the (i-1)th shift register and a resultant value of an AND operation of an output signal of the nth shift register and the (i-1)th value of the generation polynomial given to the PN code generator.

Also, the next state of the linear shift register for performing one PN chip advance is an normally operating state $\bar{r}_{m+2}$ of the linear sequence register, which can be expressed with the present state $\bar{r}_m$ and the nth order generation polynomial $\bar{g}$ of the LSSR as can be seen in equation 5:

$$r_{m+2} = [r_{n,m+2} r_{n-1,m+2} \ldots r_{1,m+2} 0]$$

$$r_{i,m+2} = \begin{cases} r_{i-2,m} \oplus (r_{n,m}g_{i-2}) \oplus & 1 < i \leq n, \\ [\{r_{n-1,m} \oplus (r_{n,m}g_{n-1})\}g_{i-1}], & \text{wherein } i \text{ is an integer} \\ r_{n-1,m} \oplus (r_{n,m}g_{n-1}), & i = 1 \\ 0, & i = 0 \end{cases} \quad \text{equation 5}$$

In equation 5 like this, the following values are input to the input end of the LSB shift register of n number of shift registers in an n stage NP code generator including n shift registers.

First, a resultant value of AND operating the output signal of the nth shift register and the (n−1)th value of the generation polynomial given to the PN code generator(AND gate) so as to be OR operated with the output signal of the (n−1)th shift register(OR gate) is input to the first shift register.

Also, a resultant value is input to the input end of the random ith shift register of shift registers from 2 to n, which is obtained through an OR operation of a first value which is obtained by an AND operation of the (i−1)th value of the generation polynomial and a value from an OR operation of an output signal of the (n−1)th shift register and a value from an AND operation of an output signal of the nth shift register and the (n−1)th value of the generation polynomial; a second value which is obtained through an AND operation of an output signal of the nth shift register with the (i−2)th value of the generation polynomial; and a third value as an output signal of the (i−2)th shift register.

Figure 4:
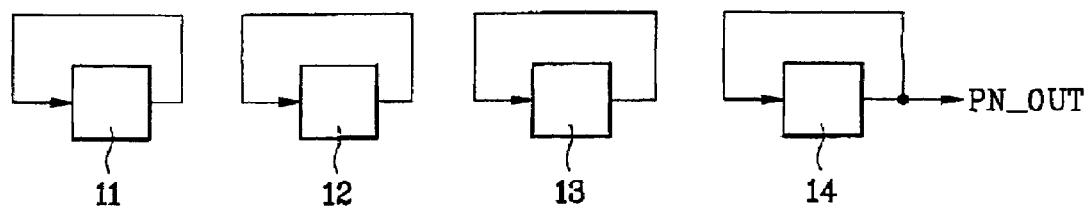
FIG. 4 is a partial block diagram of a PN code generator according to the invention for obtaining the next state of an LSSR for performing one PN chip retard in the PN code generator.

Also, the next state of the LSSR for one PN chip retard is same as shown in FIG. 4 which will be described hereinafter, and is expressed with the present state $\bar{r}_m$ of the LSSR. Namely, the retard is performed by causing feedback of an output signal of the ith shift register to the input end of the ith shift register according to $r_{i,m+1} = r_{i,m}$, or by disabling an external signal applied to each shift register during one PN chip time period.

Figure 2:
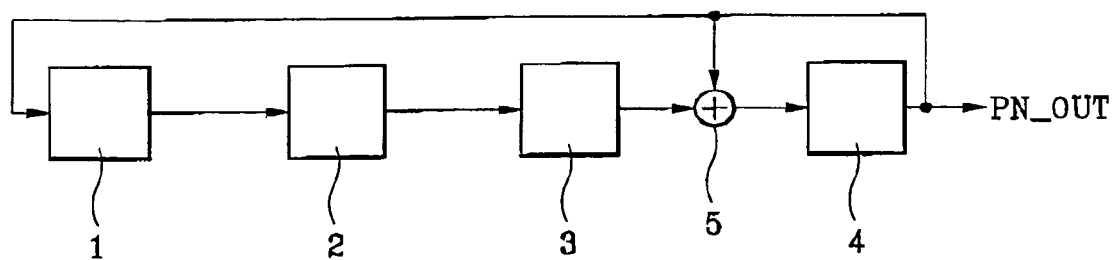
FIG. 2 is a partial block diagram of the PN code generator shown in FIG. 1 for obtaining the next state of an LSSR in the normal state.

FIG. 2 is a partial block diagram of the PN code generator shown in FIG. 1 for obtaining the next state of the linear sequence register in the normal state.

In FIG. 2, the PN code generator obtains the next state of the LSSR when the PN code generator given with generation polynomial $g(X) = X^4 + X^3 + 1$ is normally operated, in which each component of the next state of the LSSR can be expressed by using equation 4 as can be seen in equation 6:

$$r_{4,m+1} = r_{3,m} \oplus (r_{4,m}g_3) = r_{3,m} \oplus r_{4,m}$$

$$r_{3,m+1} = r_{2,m}$$

$$r_{2,m+1} = r_{1,m}$$

$$r_{1,m+1} = r_{4,m} \quad \text{equation 6}$$

Figure 3:
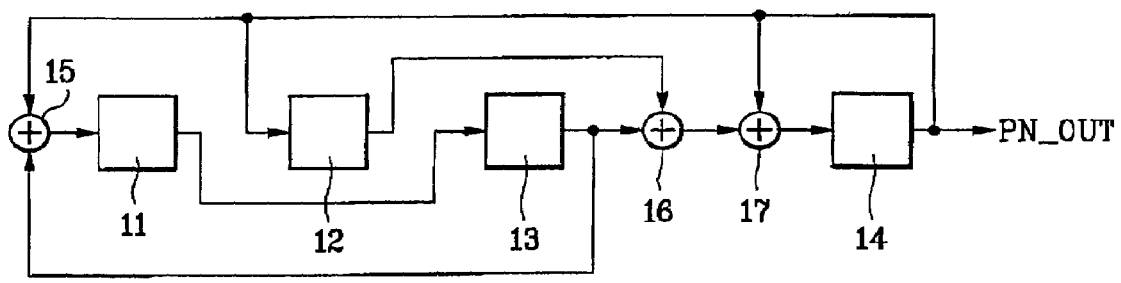
FIG. 3 is a partial block diagram of a PN code generator according to the invention for obtaining the next state of an LSSR for performing one PN chip advance in the PN code generator.

FIG. 3 is a partial block diagram of a PN code generator for obtaining the next state of an LSSR for performing one PN chip advance in a PN code generator according to the invention;

In FIG. 3, the PN code generator given with generation polynomial $g(X) = X^4 + X^3 + 1$ obtains the next state of the LSSR to perform one chip advance, in which the operation for obtaining the next state of the LSSR shown in FIG. 3 is same as equation 5 and explanation thereof.

Each component of the next state of the LSSR can be expressed by using equation 5 as can be seen in equation 7:

$$r_{4,m+2} = r_{2,m} \oplus (r_{4,m}g_2) \oplus [\{r_{3,m} \oplus (r_{4,m}g_3)\}g_3] = r_{2,m} \oplus r_{3,m} \oplus r_{4,m}$$

$$r_{3,m+2} = r_{1,m}$$

$$r_{2,m+2} = r_{4,m}$$

$$r_{1,m+2} = r_{3,m} \oplus (r_{4,m}g_3) = r_{3,m} \oplus r_{4,m} \quad \text{equation 7}$$

FIG. 4 is a partial block diagram of the PN code generator for obtaining the next state of an LSSR for performing one PN chip retard in the PN code generator according to the invention.

In FIG. 4, the PN code generator given with generation polynomial $g(X) = {}^4 + X^3 + 1$ obtains the next state of the linear sequence shift register to perform one PN chip retard, in which feedback of an output signal to each of the shift registers 11 to 14 is shown.

Figure 5:
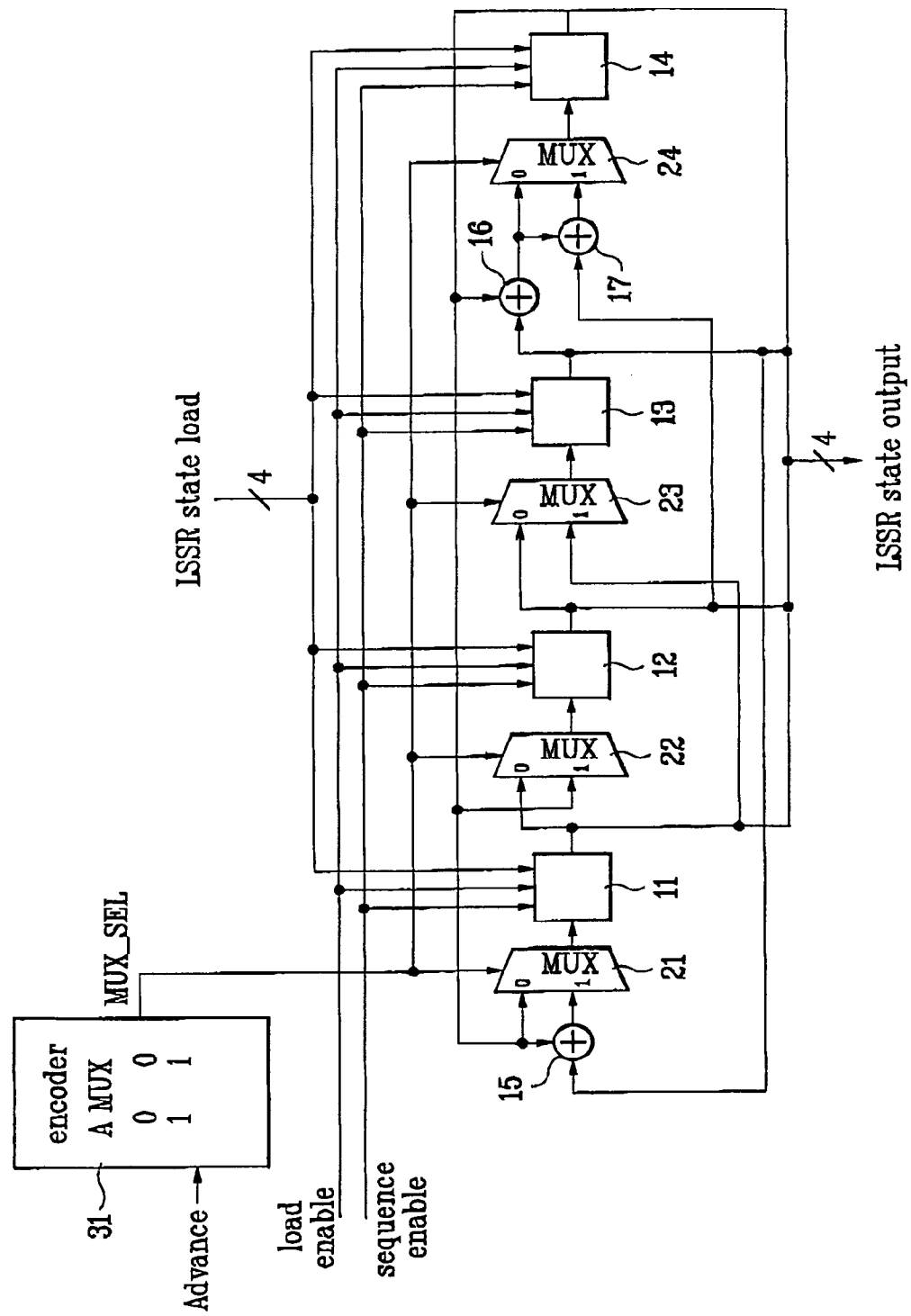
FIG. 5 is a block diagram for showing the configuration of a PN code generator according to first embodiment of the invention.

Also, the PN code generator with generation polynomial $g(X) = X^4 + X^3 + 1$ is externally provided as shown in FIG. 5 to perform one PN chip retard so that same effect can be expected when an enable signal applied to each of the shift registers 11 to 14 is disabled for one PN chip time period.

FIG. 5 is a block diagram for showing the configuration of the PN code generator according to the first embodiment of the invention.

In FIG. 5, the block diagram of the PIN code generator is given with generation polynomial $g(X) = X^4 + X^3 + 1$, and has a combined configuration of FIG. 2 and FIG. 3.

In other words, a combination is provided by a circuit for obtaining the next state of the LSSR in the normal state and another circuit for obtaining the next state of the LSSR to perform one PN chip advance.

The PN code generator according to the invention like this is provided with each of load enable signals and sequence enable signals, and is comprised of 4 LSSRs 11 to 14 serially connected with each other, 4 MUXs 21 to 24 for outputting one input signal out of multiple input signals 0 or 1 according to each control signal, each of the MUXs being connected to the output end of each of the LSSRs 11 to 14, and an encoder 31 for generating control signals to 4 MUXs for adjusting states of the PN code generator.

Herein, "0" which is one input of the MUX 21 connected to the input end of the first LSSR of the 4 LSSRs is defined as an output value of the forth LSSR 14, and "1" of the other input of the MUX 21 is defined as a value obtained by OR operating an output signal of the fourth LSSR 14 and an output signal of the third LSSR 13 by an adder 15.

Also, "0" is one input of the MUX 23 connected to the input end of the random ith (herein i is an integer between 2 to n) LSSR, for example, the third LSSR 13 in which i=3, except the first LSSR 11 of 4 LSSRs 11 to 14, and is defined as a value obtained from an OR operation of an output value of the second((i−1)th) shift register 12 with an AND operated value of an output value of the fourth shift register 14 with an (i−1)th value the second value of the generation polynomial. "1" is another input of the MUX 23 connected to the input end of the third shift register 13 and is defined as a resultant value obtained from an OR operation of first, second and third values. The first value is obtained from an AND operation of an (i−1)th value of the generation polynomial (i.e., the second value of the generation polynomial) and a value from an OR operation of an output signal of the (n−1)th shift register (i.e., the third shift register 13) and a value from an AND operation of an output signal of the nth shift register (i.e., the fourth shift register 14) and the (n−1)th (i.e., the third value) of the generation polynomial, the second value is obtained from an AND operation of an output signal of the nth shift register (i.e., the fourth shift register 14) and the (i−2)th value of the generation polynomial (i.e., the first value of generation polynomial), and the third value is an output value of the (i−2)th shift register (i.e., the first shift register). See also equation 7 for mathematical expressions of the first, second and third values.

FIG. 5 shows that sequences which are output by FIG. 2 and FIG. 3 can be collected to each of the MUXs 21 to 24 and the output of each of the MUX 21 to 24 can be controlled by a control signal(MUX_SEL) applied from the encoder 31.

Therefore, the receiving end of the transmitter can selectively treat a desired one selected from group including an operation in the normal state of the PN code generator and an operation of one PN chip advance within one clock.

The receiving end of the transmitter in the first embodiment of the invention can perform a retard by using a disabling method during one PN chip time period using a sequence enable signal which is an external enable signal applied to each of the shift registers.

Figure 6:
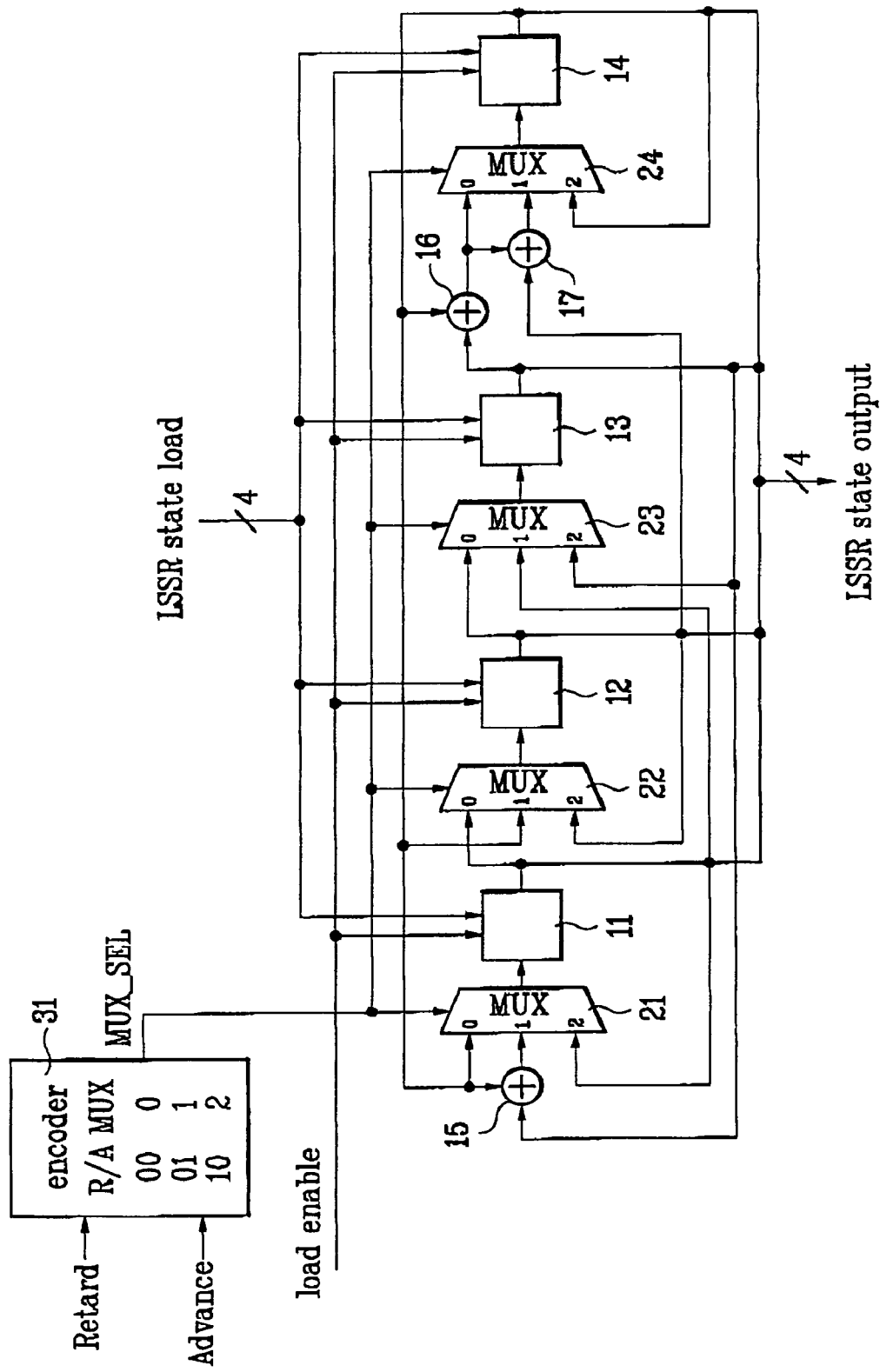
FIG. 6 is a block diagram for showing the configuration of a PN code generator according to second embodiment of the invention.

FIG. 6 is a block diagram for showing the configuration of a PN code generator according to the second embodiment of the invention.

In FIG. 6, the PN code generator is given with generation polynomial $g(X)=X^4+X^3+1$ and has a combined shape of FIG. 2 to FIG. 4.

In other words, in FIG. 6, a first circuit for obtaining the next state of the LSSR in the normal state, a second circuit for obtaining the next state of the LSSR to perform one PN chip advance, and a third circuit for obtaining the next state of the LSSR to perform one PN chip retard are combined. The PN code generator according to the second embodiment of the invention is provided with a Load enable signal, and is comprised of 4 shift registers 11 to 14 serially connected with each other; 4 MUXs 21 to 24 for outputting one input signal out of multiple input signals according to each control signal, each of the MUXs 21 to 24 being connected to the input end of each of the shift registers 11 to 14; and an encoder 31 for generating a control signal to set the state of the PN code generator to 4 MUXs 21 to 24.

Herein, "0" is one input of the MUX 21 connected to the input end of the first shift register 11 of the shift registers and is defined as an output value of the fourth LSSR 14. "1" is another input of the MUX 21 and is defined as a value of an OR operation of an output value of the fourth shift register 14 and an output value of the third shift register 13 by an adder 15. "2" is another input of the MUX 21 and is defined as an output signal of the shift register 11.

Also, "0" is one input of the MUX 23 connected to the input end of the random ith (herein i is an integer between 2 to n) LSSR, for example, the third LSSR 13 in which i=3, except the first LSSR 11 of 4 LSSRs 11 to 14, and is defined as a value obtained from an OR operation of an output value of the second((i−1)th) shift register 12 with an AND operated value of an output value of the fourth shift register 14 with an output value of the second shift register 12. "1" is another input of the MUX 23 connected to the input end of the third shift register 13 and is defined as a resultant value obtained from an OR operation of first, second and third values. The first value is obtained from an AND operation of an (i−1)th value the generation polynomial (i.e., the second value of the generation polynomial) and a value from an OR operation of an output signal of the (n−1)th shift register (i.e., the third shift register 13) and a value from an AND operation of output signal of the nth shift register (i.e., the fourth shift register 14) and the (n−1)th (i.e., the third value) of the generation polynomial, the second value is obtained from an AND operation of an output signal of the nth shift register (i.e., the fourth shift register 14) and the (i−2)th value of the generation polynomial (i.e., the first value of generation polynomial), and the third value is an output value of the (i−2)th shift register (i.e., the first shift register). "2" is another input of the MUX 23 connected to the input end of third shift register 13 and is defined as an output signal of third shift register 13.

In FIG. 6, it can be seen that output sequences from FIG. 2 to FIG. 4 can be collected to each of the MUXs 21 to 24 and a control signal (MUX_SEL) applied from an encoder can be used to control an output of each of the MUXs 21 to 24.

Therefore, the receiving end of the transmitter can treat a desired one selected from an operation in the normal state of the PN code generator, one PN chip advance operation or one PN chip retard operation within one clock.

Figure 7:
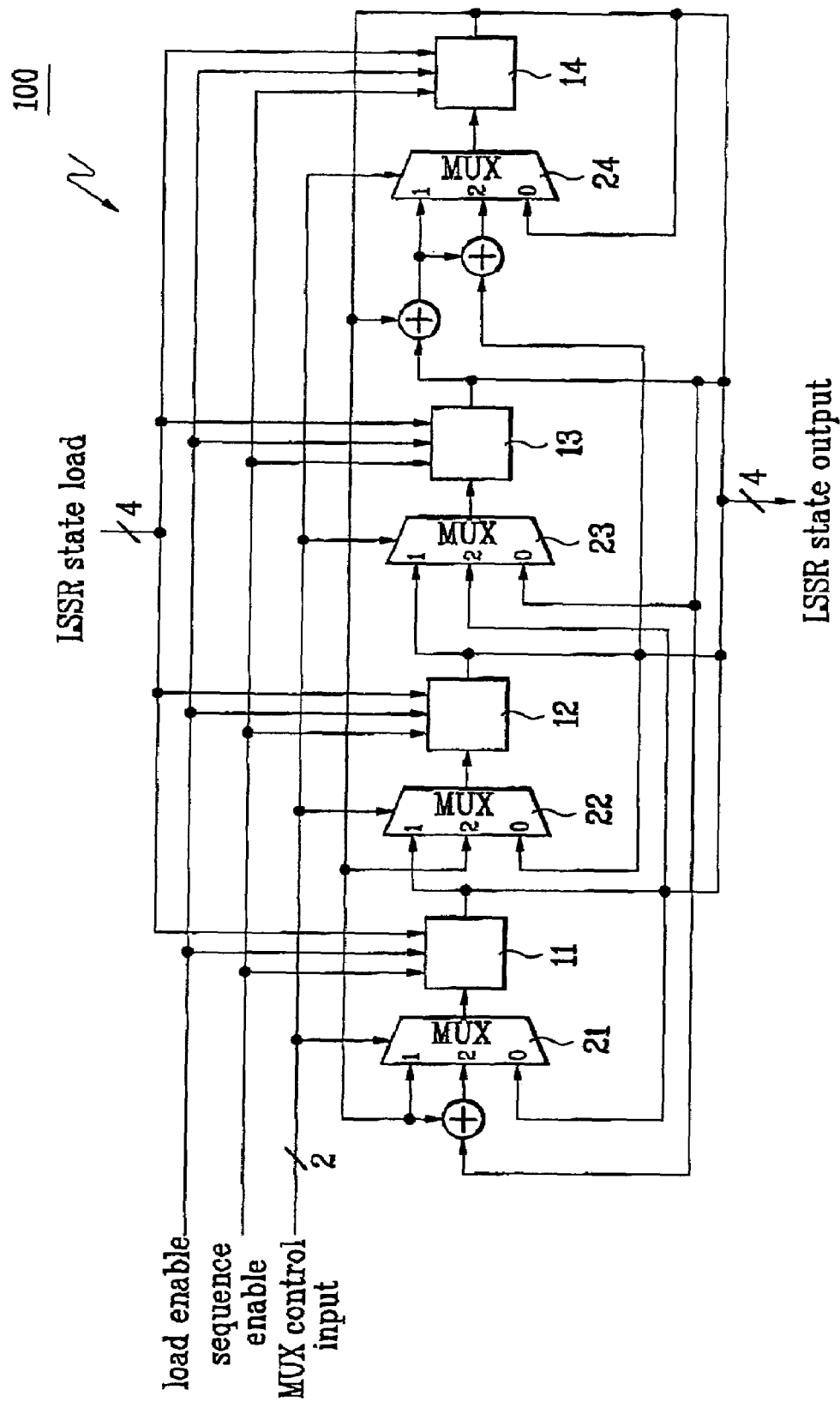
FIG. 7 is a block diagram for showing the configuration of an LSSR of a PN code generator according to third embodiment of the invention.
Figure 8:
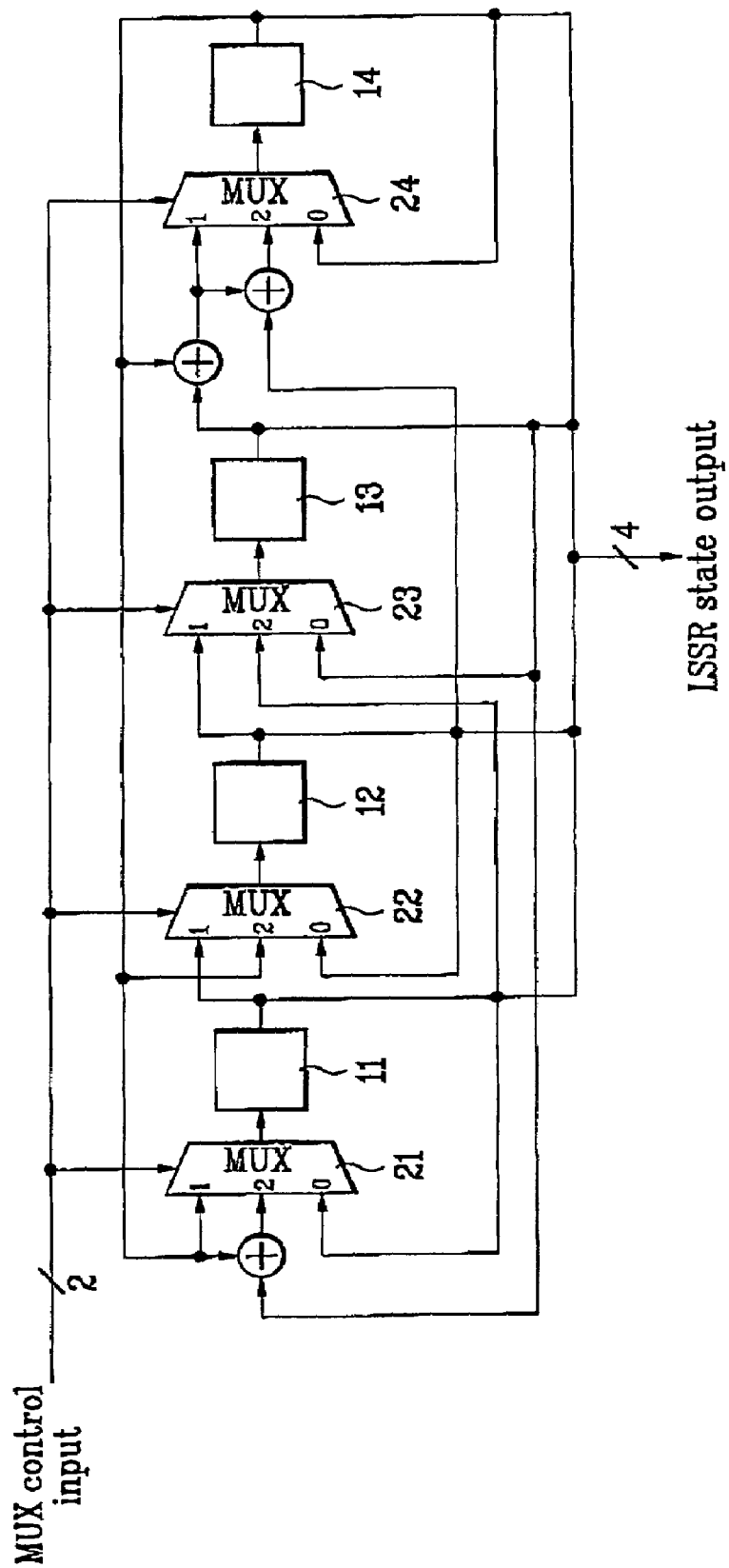
FIG. 8 illustrates an operation of generating PN codes of the PN code generator shown in FIG. 7.

FIG. 7 is a block diagram for showing the configuration of an LSSR of a PN code generator according to the third embodiment of the invention, and FIG. 8 illustrates an operation of generating PN codes of the PN code generator shown in FIG. 7.

The configuration of the LSSR of the PN code generator according to the third embodiment of the invention is similar to the configuration of the PN code generator according to the second embodiment of the invention which is shown in FIG. 6.

Yet, though one PN chip advance and one PN chip retard operations are controlled by the encoder 31 in FIG. 6, the advance and retard operations are controlled in response to an MUX control input in the third embodiment shown in FIG. 7.

The LSSR of the PN code generator according to the third embodiment of the invention like this is comprised of 4 MUXs 21 to 24 and 4 stage LSSRs 11 to 14 for temporally storing outputs from the MUXs 21 to 24, in which an LSSR state load and an Load enable are applied only in initially loading specific values to the LSSRs 11 to 14, so in FIG. 8 for showing operations to generate PN code lines, those lines for applying the LSSR state load and load enable are omitted.

In the third embodiment of the invention, the state of the LSSRs 11 to 14 for obtaining the next normal state of the LSSRs 11 to 14, the second next state of the LSSRs 11 to 14 for obtaining one PN chip advance, or the next state of the LSSRs 11 to 14 for obtaining one PN chip retard is output according to MUX control input(MC).

Figure 9:
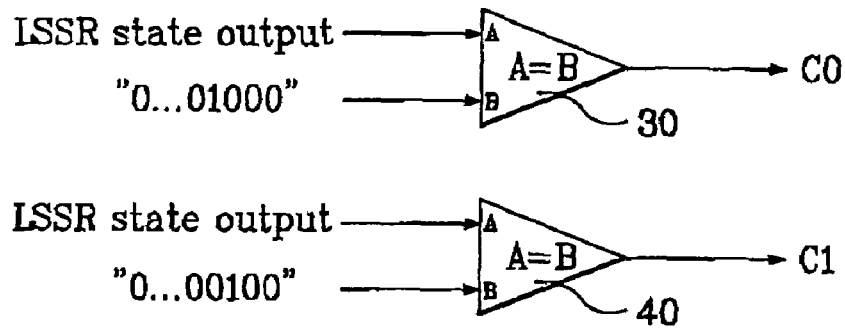
FIG. 9 shows the configuration of a comparator for comparing the present load state and the next load state of the LSSR for generating the PN codes of the invention shown in FIG. 7.
Figure 10:
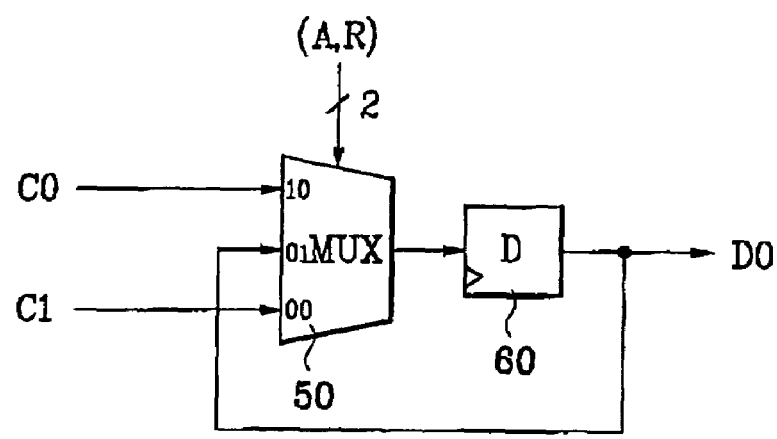
FIG. 10 shows the configuration of an MUX and a flip-flop for outputting load commands from each output of the comparator shown in FIG. 9 and index shown in table 1.
Figure 11:
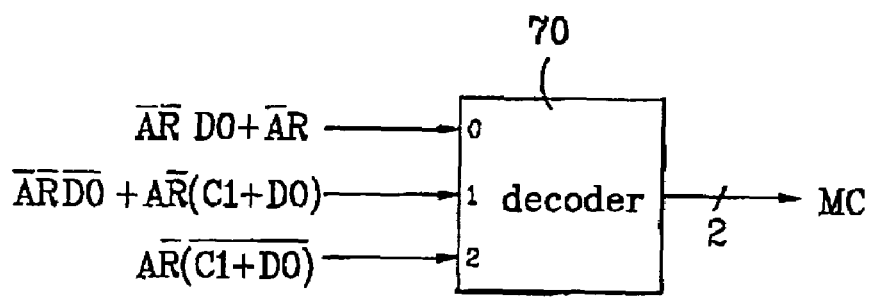
FIG. 11 shows a decoder for controlling the MUX shown in FIG. 7.
Figure 12:
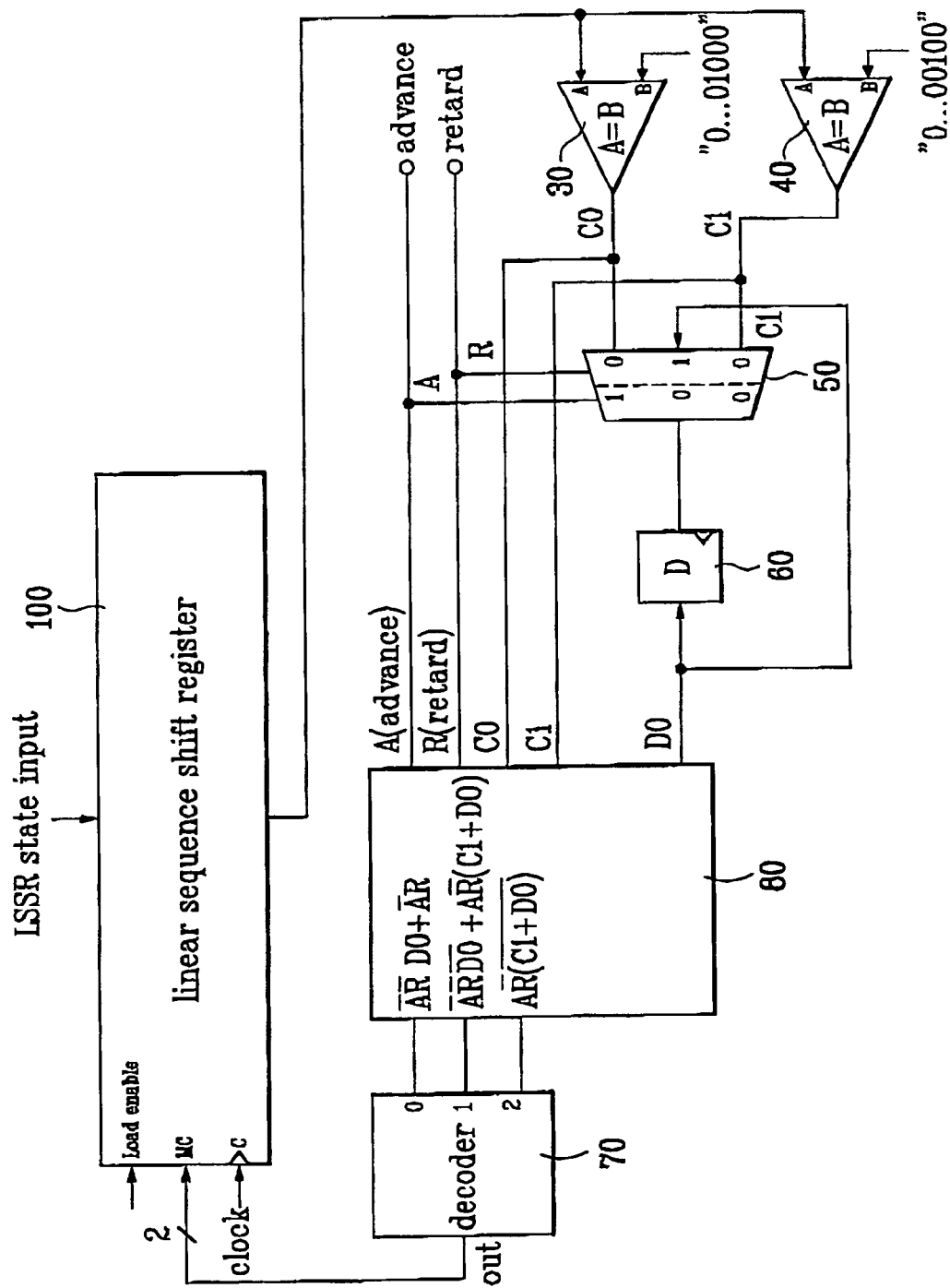
FIG. 12 shows the overall configuration of the PN code generator according to the third embodiment of the invention shown in FIG. 7 to FIG. 11.

FIG. 9 shows the configuration of comparators for comparing the present load state and the next load state of the LSSR for generating the PN codes of the invention shown in FIG. 7, FIG. 10 shows the configuration of the MUX and a flip-flop for outputting load commands from each output of the comparators shown in FIG. 9 and index shown in table 1, FIG. 11 shows a decoder for controlling the MUX shown in FIG. 7, and FIG. 12 shows the overall configuration of the PN code generator according to the third embodiment of the invention shown in FIG. 7 to FIG. 11.

nth order generation polynomial g(X) which is used in the third embodiment of the invention like this is same as equation 1 and equation 2.

If the present state of each of the LSSRs 11 to 14 is defined $\bar{r}_m$, the state can be expressed in a vector form as in equation 3 which is explained hereinabove.

If the next normal state of each of the LSSRs 11 to 14 is defined $\bar{r}_{m+1}$, the next state $\bar{r}_{m+1}$ is obtained from generation polynomial of the present state $\bar{r}_m$ of the LSSRs 11 to 14 as can be see in equation 4, the MSB $r_{n,m}$ of the LSSRs and equation 2.

Again, the next state of the LSSR 11 to 14 for the next one step advance is the second next state $\bar{r}_{m+2}$ of the LSSRs of the normal operation, which can be expressed by the present state $\bar{r}_m$ of the LSSRs 11 to 14 and nth order generation polynomial $\bar{g}$ expressed in equation 2 as in equation 5. The equation 5 can be expressed again with equation 8 and equation 9:

$$\bar{r}_{m+2} = [r_{n,m+2} \cdots r_{n-1,m+2} 0]$$ equation 8

$$r_{i,m+2} = \begin{cases} r_{i-2,m} \oplus (r_{n,m} g_{i-2}) \oplus [(r_{n-1,m} \oplus (r_{n,m} g_{n-1})) g_{i-1}], & 1 < i < n \\ r_{n-1,m} \oplus (r_{n,m} g_{n-1}), & i = 1 \\ 0, & i = 0 \end{cases}$$ equation 9

Also, the reason that $r_{i,m+2}$ in the foregoing equation 8 can be expressed as in equation 8 is expressed in equation 10 and equation 11:

$$r_{1,m+2} = r_{0,m+1} \oplus (r_{n,m+1} g_0)$$ equation 10

$$= r_{n,m+1}$$

$$= r_{n-1,m} \oplus (r_{n,m} g_{n-1})$$

$$r_{i,m+2} = r_{i-1,m+1} \oplus (r_{n,m+1} g_{i-1})$$ equation 11

$$= (r_{i-2,m} \oplus (r_{n,m} g_{i-2})) \oplus [(r_{n-1,m} \oplus (r_{n,m} g_{n-1})) g_{i-1}]$$

The next state of the LSSRs 11 to 14 for the second next PN chip retard is the present state $\bar{r}_m$ of the LSSRs 11 to 14 in the normal operation.

In the case of the PN code generator comprised of n bit shift registers, the longest length is (n−1) for continual output of "0" bit according to the characteristic thereof. However, it is known that insertion of "0" bit output is supposed to be added behind "0" bit output of (n−1) length. This is, considering the load state of the present n bit shift register, same as repeating the state once more in which the load state is "0 . . . 00010". Herein, the right side in the load state of the n bit shift register is referred to the MSB.

The following table 1 shows an example of generating PN codes in the following equation 12, which shows the state of the PN code generator of FIG. 12 proposed in the invention.

TABLE 1

| Input | | Present | | | | Next | | | | Output |
|---|---|---|---|---|---|---|---|---|---|---|
| A | R | Resister load state (PN_State) | C0 | C1 | D0 | Resister load state (PN_State) | C0 | C1 | D0 | MC |
| 0 | 0 | ... | | | | | | | | |
| 0 | 0 | 10000 | 1 | 0 | 0 | 0100 | 0 | 1 | 0 | 1 |
| 0 | 0 | 0100 | 0 | 1 | 0 | 0010 | 0 | 0 | 1 | 1 |
| 0 | 0 | 0010 | 0 | 0 | 1 | 0010 | 0 | 0 | 0 | 0 |
| 0 | 0 | 0010 | 0 | 0 | 0 | 0001 | 0 | 0 | 0 | 1 |
| 0 | 0 | 0001 | 0 | 0 | 0 | 1001 | 0 | 0 | 0 | 1 |
| 0 | 0 | ... | | | | ... | | | | ... |
| 1 | 0 | ... | | | | ... | | | | ... |
| 1 | 0 | 1000 | 1 | 0 | 0 | 0010 | 0 | 0 | 1 | 2 |
| 1 | 0 | 0100 | 0 | 1 | 0 | 0010 | 0 | 0 | 0 | 1 |
| 1 | 0 | 0010 | 0 | 0 | 1 | 0001 | 0 | 0 | 0 | 1 |
| 1 | 0 | 0010 | 0 | 0 | 0 | 1001 | 0 | 0 | 0 | 2 |
| 1 | 0 | 0001 | 0 | 0 | 0 | 1101 | 0 | 0 | 0 | 2 |
| 1 | 0 | ... | | | | ... | | | | ... |
| 0 | 1 | ... | | | | ... | | | | ... |
| 0 | 1 | 1000 | 1 | 0 | 0 | 1000 | 1 | 0 | 0 | 0 |
| 0 | 1 | 0100 | 0 | 1 | 0 | 0100 | 0 | 1 | 0 | 0 |
| 0 | 1 | 0010 | 0 | 0 | 1 | 0010 | 0 | 0 | 1 | 0 |
| 0 | 1 | 0010 | 0 | 0 | 0 | 0010 | 0 | 0 | 0 | 0 |
| 0 | 1 | 0001 | 0 | 0 | 0 | 0001 | 0 | 0 | 0 | 0 |
| 0 | 1 | ... | | | | ... | | | | ... |

In the foregoing table 1, "A" means one PN chip advance command, and index "R" means one PN chip retard command, Also, indexes "C0" and "C1" express each output of the comparators shown in FIG. 7, and index "MC" means an MUX control input.

The PN code generator of the invention shown in FIG. 12 uses generation polynomial as the following equation 12:

$$g(X) = X^4 + X^3 + 1$$ equation 12

The PN code generator according to the third embodiment of the invention can be operated when the next normal state of the LSSRs 20 to 23, the next state of the LSSRs 20 to 23 for one PN chip advance and the next state of the LSSRs for one PN chip retard are output to the decoder 70 vian AN LSSR 100, first and second comparators 30 and 40, a MUX 50, a flip-flop 60 and a combinational circuit 80, and outputs of the MUXs 21 to 24 arranged at the input end of the LSSRs 11 to 14 respectively are controlled according to output of the decoder 70.

In the invention, the first and second comparators 30 and 40 shown in FIG. 9 and FIG. 12 compare the present and next load states of the LSSR according to LSSR state inputs, and the MUX 50 and the flip-flop 60 shown in FIG. 10 and FIG. 12 are used for outputting each output of the first and second comparators 30 and 40 and load commands of the LSSRs 20 to 23 from indexes an ANd R shown in table 1.

Also, the decoder 70 shown in FIG. 11 and FIG. 12 are used for controlling the MUXs 10 to 13 of FIG. 7 and FIG.

8 from one PN chip retarded input. Here, in the input end of the decoder 70, output values C0 and C1 of one PN chip advance signal input end, one PN chip retard signal input end, and the first and second comparators 30 and 40; and an output signal D0 of the flip-flop 60 are output to the decoder 70 after combined in the combinational circuit 80. In the decoder 70, one PN chip advance signal 2('10' in binary number) to the LSSR 100 according to an input signal in the combinational circuit 80, one PN chip retard signal 0('00' in binary number) or a signal 1('01' in binary number) for proceeding of the next state is output.

Accordingly, the MUXs 10 to 13 are controlled from one PN chip advanced or one PN chip retarded input as in FIG. 7 and FIG. 8 of the invention so that one PN chip advance and retard including a normal operation of PN code generation can be treated within one clock cycle.

In other words, the present PN state is the LSB in the left side and the MSB in the right side of the LSSR output. Here, when '10' (0010 the next state of 0100) is first output, the MUX control input (MC) signal is 0, so it is a retard state of repeating the present state once more, and when '10' is second output, the MUX control input (MC) signal is 1 to pass to the next state output.

Also, in the case of proceeding, when the advance is 1 of inputs of table 1 as the initial '100' is output, the MUX output is 1 as the normal state, and when the advance is 1 also in '10' as the next state, the MUX output is 1 as the normal state, so that "0" bit output insertion can be realized to the short PN code generated in respect to I channel and Q channel.

According to the invention as described hereinabove, one PN chip advance or retard can be selectively performed during one system clock while the PN code generator is operated in the system clock higher than the PN chip rate. Therefore, when this PN code generator is applied to th receiving end of a CDMA type radio communication system, PN code tracking can be performed by a system clock so that parallel processing through sharing sources can be increased as well as accepting quantity of a finger provided in the receiving end of the radio communication system.

What is claimed is:

1. An apparatus for generating PN (pseudo noise) codes comprising:
   a control unit for outputting a control signal for a normal state or a PN chip advance;
   a plurality of multiplexers for outputting an output value of a next state for a normal operation or an output value of a following next state ($\vec{r}_{m+2}$) for a PN chip advance as an output signal in response to the control signal of said control unit;
   a plurality of shift registers for outputting a PN chip code of a next state($\vec{r}_{m+1}$) or a following next state ($\vec{r}_{m+2}$) during one system clock time period in response to said outputs of the multiplexers, an input end of each of said shift registers being connected to an output end of each of said multiplexers,
   wherein to obtain the output value of the following next state ($\vec{r}_{m+2}$) of shift registers for one PN chip advance, the output values are determined based on the following equation:

$$\vec{r}_{m+2} = \lfloor r_{n,m+2} r_{n-1,m+2} \cdots r_{1,m+2} 0 \rfloor,$$

$$r_{i,m+2} = \begin{cases} r_{i-2,m} \oplus (r_{n,m} g_{i-2}) \oplus [\{r_{n-1,m} \oplus & 1 < i \leq n, \\ (r_{n,m} g_{n-1})\} g_{i-1}], & \text{wherein } i \text{ is an integer} \\ r_{n-1,m} \oplus (r_{n,m} g_{n-1}), & i = 1 \\ 0, & i = 0 \end{cases}$$

wherein $\vec{r}_m$ is present state values of the shift registers and $\vec{g}_n$ is parameter values of a generation polynomial.

2. The apparatus for generating PN codes according to claim 1, wherein said control unit further outputs a control signal for one PN chip retard; and wherein said multiplexers further output an output value of the related state for one PN chip retard.

3. A method of generating PN codes in a PN code generator comprising shift registers and using an nth order generation polynomial g(X)

$$g(X) = g_n X^n = g_{n-1} X^{n-1} + \ldots + g_1 X + 1,$$

the method comprising:

determining parameter values ($\vec{g}_n$) of the nth order generation polynomial by a first equation, wherein the first equation is $$\vec{g} [g_n g_{n-1} \cdots g_1 g_0],$$

$$g_i = \begin{cases} 1, & i = n \\ 0 \text{ or } 1, & 0 < i < n, \\ 1, & [[i = n]] i = o \end{cases} \quad \text{wherein } i \text{ is an integer;}$$

determining present states ($\vec{r}_m$) of shift registers of the PN code generator by a second equation, wherein the second equation is $$\vec{r}_m = \lfloor r_{n,m} r_{n-1,m} \cdots r_{1,m} r_{0,m} \rfloor$$

$$r_{i,m} = \begin{cases} 0 \text{ or } 1, & 0 < i \leq n, \quad \text{wherein } i \text{ is an integer} \\ 0, & i = 0 \end{cases} \text{; and}$$

inputting state values into the shift registers for providing advanced states ($\vec{r}_{m+2}$) of the shift registers based on a third equation using the present states ($\vec{r}_m$) of the shift registers and the parameter values ($\vec{g}_n$), wherein the third equation is $$\vec{r}_{m+2} = \lfloor r_{n,m+2} r_{n-1,m+2} \cdots r_{1,m+2} 0 \rfloor,$$

$$r_{i,m+2} = \begin{cases} r_{i-2,m} \oplus (r_{n,m} g_{i-2}) \oplus & 1 < i \leq n, \\ [\{r_{n-1,m} \oplus (r_{n,m} g_{n-1})\} g_{i-1}], & \text{wherein } i \text{ is an integer} \\ r_{n-1,m} \oplus (r_{n,m} g_{n-1}), & i = 1 \\ 0, & i = 0 \end{cases}$$

4. The method for generating PN codes according to claim 3, wherein the PN generator uses a same system clock as an output rate of the PN generator.

5. The method for generating PN codes according to claim 3, further comprising:
performing an operation for a PN chip retard for the LSSR by disabling external enable signals applied to each of the shift registers during one PN chip time period.

6. A method of generating a PN code in a PN code generator comprising N number of shift registers and using a same system clock as a PN chip rate, the method comprising:
calculating advanced state values of each shift register based on present state values of each shift register; and
generating the PN code according to the advanced state values during one system clock time,
wherein the advanced state value is calculated based on the present state value using the following equations:

$$\vec{r}_{m+2} = \lfloor r_{n,m+2} r_{n-1,m+2} \ldots r_{1,m+2} 0 \rfloor,$$

$$r_{i,m+2} = \begin{cases} r_{i-2,m} \oplus (r_{n,m} g_{i-2}) \oplus [\{r_{n-1,m} \oplus (r_{n,m} g_{n-1})\} g_{i-1}], & 1 < i \leq n, \text{ wherein } i \text{ is an integer} \\ r_{n-1,m} \oplus (r_{n,m} g_{n-1}) & i = 0 \\ 0, & i = 0 \end{cases}$$

wherein $\vec{r}_{m+2}$ is the advanced state values of an nth shift registers, $\vec{r}_m$ is the present state values of the shift registers, and $\vec{g}_n$ is parameter values of a generation polynomial.

* * * * *